(12) United States Patent
Husband et al.

(10) Patent No.: US 11,073,030 B1
(45) Date of Patent: Jul. 27, 2021

(54) AIRFOIL ATTACHMENT FOR GAS TURBINE ENGINES

(71) Applicant: Raytheon Technologies Corporation, Farmington, CT (US)

(72) Inventors: Jason Husband, Glastonbury, CT (US); David A. Welch, Quaker Hill, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 0 days.

(21) Appl. No.: 16/879,862

(22) Filed: May 21, 2020

(51) Int. Cl.
| | |
|---|---|
| F01D 5/30 | (2006.01) |
| F01D 5/32 | (2006.01) |
| F01D 5/22 | (2006.01) |
| F01D 5/28 | (2006.01) |

(52) U.S. Cl.
CPC .......... *F01D 5/3007* (2013.01); *F01D 5/326* (2013.01); *F01D 5/22* (2013.01); *F01D 5/282* (2013.01); *F01D 5/3069* (2013.01); *F01D 5/3076* (2013.01); *F05D 2220/36* (2013.01); *F05D 2260/36* (2013.01)

(58) Field of Classification Search
CPC .......... F01D 5/3007; F01D 5/326; F01D 5/22; F01D 5/282; F01D 5/3069; F01D 5/3076
See application file for complete search history.

(56) References Cited

U.S. PATENT DOCUMENTS

| | | | |
|---|---|---|---|
| 2,868,439 A * | 1/1959 | Hampshire | F01D 5/282 415/141 |
| 3,694,104 A | 9/1972 | Erwin | |
| 4,047,840 A * | 9/1977 | Ravenhall | F02K 3/06 416/135 |
| 4,643,647 A | 2/1987 | Perry | |
| 4,995,788 A * | 2/1991 | Turnberg | F01D 5/282 416/230 |

(Continued)

FOREIGN PATENT DOCUMENTS

| | | |
|---|---|---|
| EP | 2362066 | 8/2011 |
| EP | 2458153 | 5/2012 |

OTHER PUBLICATIONS

International Search Report and Written Opinion for PCT Application No. PCT/US2014/050614 completed Nov. 19, 2014.

(Continued)

*Primary Examiner* — Justin D Seabe
*Assistant Examiner* — Ryan C Clark
(74) *Attorney, Agent, or Firm* — Carlson, Gaskey & Olds, P.C.

(57) ABSTRACT

An airfoil assembly for a gas turbine engine according to an example of the present disclosure includes, among other things, an airfoil including an airfoil section extending from a root section. The airfoil section extends between a leading edge and a trailing edge in a chordwise direction and extending between a tip portion and the root section in a radial direction. The airfoil section defines a pressure side and a suction side separated in a circumferential direction. A root mount includes first and second mount members secured to circumferentially opposed sides of the root section. Arcuate circumferential faces of the first and second mount members are dimensioned to pivotably mount the root section to a hub in an installed position. A method of assembly is also disclosed.

20 Claims, 7 Drawing Sheets

(56) References Cited

U.S. PATENT DOCUMENTS

| | | | |
|---|---|---|---|
| 5,022,824 | A | 6/1991 | Violette et al. |
| 5,022,825 | A * | 6/1991 | Violette ................ F04D 29/668 |
| | | | 416/205 |
| 5,102,300 | A | 4/1992 | Violette et al. |
| 5,129,787 | A | 7/1992 | Violette et al. |
| 5,141,400 | A * | 8/1992 | Murphy ................ F04D 29/324 |
| | | | 416/204 A |
| 5,163,817 | A * | 11/1992 | Violette ................ B64C 11/06 |
| | | | 416/204 A |
| 5,240,377 | A * | 8/1993 | Farr ....................... F01D 5/282 |
| | | | 416/229 R |
| 5,340,280 | A * | 8/1994 | Schilling ................ F01D 5/282 |
| | | | 416/229 A |
| 5,562,419 | A | 10/1996 | Crall et al. |
| 5,791,879 | A | 8/1998 | Fitzgerald et al. |
| 5,839,882 | A | 11/1998 | Finn et al. |
| 6,039,542 | A | 3/2000 | Schilling et al. |
| 6,213,720 | B1 | 4/2001 | Farmer |
| 6,431,837 | B1 * | 8/2002 | Velicki ................ F04D 29/388 |
| | | | 416/223 R |
| 6,454,536 | B1 | 9/2002 | Evans et al. |
| 6,872,340 | B2 | 3/2005 | Cundiff et al. |
| 7,503,750 | B1 | 3/2009 | Violette |
| 7,828,526 | B2 | 11/2010 | Cairo et al. |
| 7,918,644 | B2 | 4/2011 | Schreiber |
| 8,061,997 | B2 | 11/2011 | Le Hong et al. |
| 8,182,228 | B2 | 5/2012 | Riley et al. |
| 8,231,354 | B2 | 7/2012 | Campbell et al. |
| 8,241,003 | B2 | 8/2012 | Roberge |
| 8,496,438 | B2 | 7/2013 | Lafont |
| 8,500,410 | B2 | 8/2013 | De Moura et al. |
| 8,586,082 | B2 * | 11/2013 | Benke ................ A61K 9/1694 |
| | | | 424/452 |
| 8,616,849 | B2 | 12/2013 | Menheere et al. |
| 8,845,292 | B2 | 9/2014 | Lafont |
| 8,939,727 | B2 | 1/2015 | Campbell et al. |
| 9,506,353 | B2 | 11/2016 | Schwarz et al. |
| 9,587,496 | B2 | 3/2017 | Collins et al. |
| 9,657,577 | B2 | 5/2017 | Weisse |
| 9,840,921 | B2 | 12/2017 | Petellaz et al. |
| 9,963,979 | B2 * | 5/2018 | Freeman ................ F01D 5/284 |
| 10,132,171 | B2 * | 11/2018 | Locatelli ................ F01D 5/282 |
| 10,577,951 | B2 | 3/2020 | Vetters et al. |
| 10,774,660 | B2 * | 9/2020 | Luczak ................ F01D 5/3092 |
| 2008/0181766 | A1 | 7/2008 | Campbell et al. |
| 2009/0285686 | A1 | 11/2009 | Violette |
| 2011/0070092 | A1 | 3/2011 | Gerlach |
| 2011/0194941 | A1 | 8/2011 | Parkin et al. |
| 2012/0163986 | A1 * | 6/2012 | Darkins, Jr. ............ F01D 9/044 |
| | | | 416/241 B |
| 2013/0039774 | A1 | 2/2013 | Viens et al. |
| 2013/0064676 | A1 | 3/2013 | Salisbury et al. |
| 2013/0167555 | A1 | 7/2013 | Schwarz et al. |
| 2013/0239586 | A1 | 9/2013 | Parkin et al. |
| 2013/0247589 | A1 * | 9/2013 | Seo ..................... G01B 9/02075 |
| | | | 62/3.2 |
| 2015/0151485 | A1 | 6/2015 | Godon et al. |
| 2016/0160659 | A1 | 6/2016 | Obuchi et al. |
| 2016/0215784 | A1 | 7/2016 | Drozdenko et al. |
| 2016/0222978 | A1 | 8/2016 | Drozdenko et al. |
| 2018/0010463 | A1 | 1/2018 | Lariochiuta et al. |
| 2018/0036914 | A1 * | 2/2018 | Marsal ................ D03D 25/005 |
| 2018/0111332 | A1 | 4/2018 | Collis et al. |
| 2018/0119549 | A1 * | 5/2018 | Vetters ................... F01D 5/147 |
| 2018/0147797 | A1 | 5/2018 | Chassignet |
| 2019/0301292 | A1 | 10/2019 | Harris |
| 2020/0123917 | A1 * | 4/2020 | Husband ................ F01D 5/282 |

OTHER PUBLICATIONS

International Preliminary Report on Patentability for PCT Application No. PCT/US2014/050614 completed Mar. 15, 2016.

Extended European Search Report for European Patent Application No. 14842050.8 completed May 9, 2017.

Masterbond, Adhesives | Sealants | Coatings. Understanding bond line thickness. Retrieved Sep. 24, 2018 from: https://www.masterbond.com/techtips/understanding-bond-line-thickness.

Huntsman. Users guide to adhesives. Retrieved May 31, 2007 from https://www.freemansupply.com/datasheets/adhesivesguide.pdf, Huntsman Corporation.

* cited by examiner

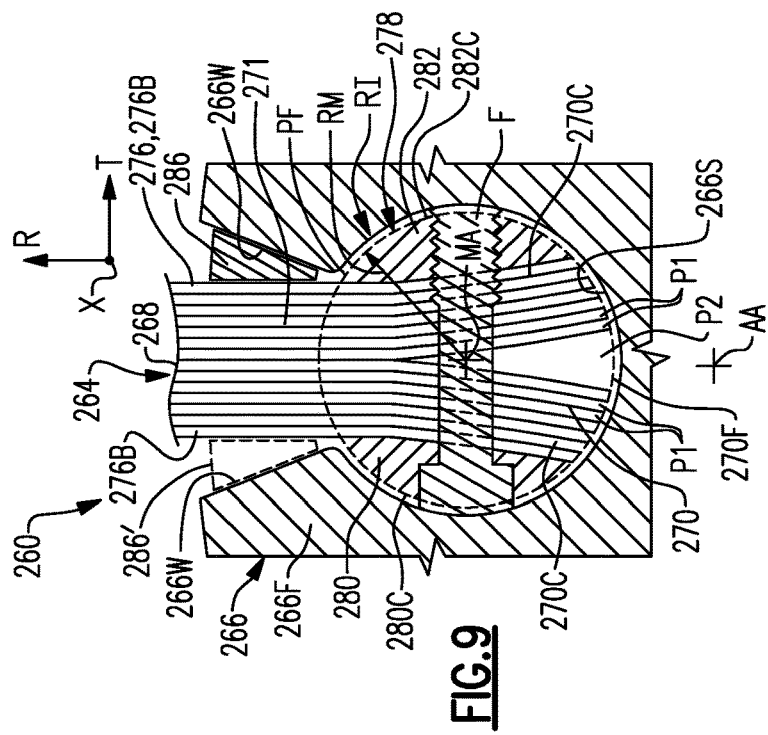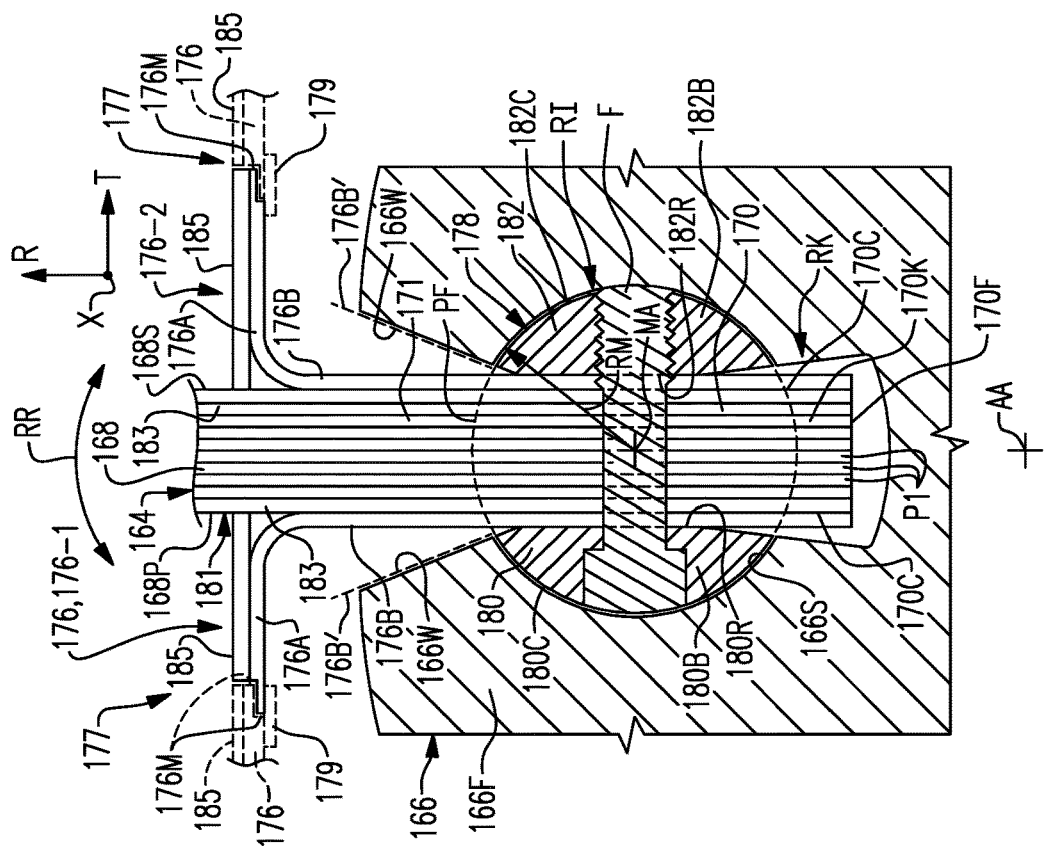

AIRFOIL ATTACHMENT FOR GAS TURBINE ENGINES

BACKGROUND

This disclosure relates to a gas turbine engine, and more particularly to attachment of airfoils.

Gas turbine engines can include a fan for propulsion air and to cool components. The fan also delivers air into a core engine where it is compressed. The compressed air is then delivered into a combustion section, where it is mixed with fuel and ignited. The combustion gas expands downstream over and drives turbine blades. Static vanes are positioned adjacent to the turbine blades to control the flow of the products of combustion. The fan typically includes an array of fan blades having dovetails that are mounted in slots of a fan hub driven by a turbine.

SUMMARY

An airfoil assembly for a gas turbine engine according to an example of the present disclosure includes an airfoil including an airfoil section extending from a root section. The airfoil section extends between a leading edge and a trailing edge in a chordwise direction and extending between a tip portion and the root section in a radial direction. The airfoil section defines a pressure side and a suction side separated in a circumferential direction. A root mount includes first and second mount members secured to circumferentially opposed sides of the root section. Arcuate circumferential faces of the first and second mount members are dimensioned to pivotably mount the root section to a hub in an installed position.

A further embodiment of any of the foregoing embodiments includes at least one platform including a first portion and a second portion. The first portion extends circumferentially from the second portion, and the second portion is trapped between the root section and a respective one of the first and second mount members.

In a further embodiment of any of the foregoing embodiments, the circumferential face of the first mount member and the circumferential face of the second mount member are dimensioned to substantially follow an interface profile established by a common radius swept about a mount axis extending through the root section.

In a further embodiment of any of the foregoing embodiments, the root section extends radially inwardly from the airfoil section to a radially inner face, and the radially inner face is dimensioned to substantially follow the interface profile.

In a further embodiment of any of the foregoing embodiments, the root section extends radially inwardly from the airfoil section to a radially inner face, and the radially inner face is situated outside of a boundary of the interface profile to limit rotation of the root section about the mount axis in the installed position.

In a further embodiment of any of the foregoing embodiments, the root section comprises a first material, and each of the first and second mount members comprises a second material that differs from the first material.

In a further embodiment of any of the foregoing embodiments, the first material is a composite material, and the second materials is a metallic material.

In a further embodiment of any of the foregoing embodiments, the composite material includes a plurality of plies arranged to extend from the root section at least partially into the airfoil section.

In a further embodiment of any of the foregoing embodiments, the airfoil is a fan blade.

A gas turbine engine according to an example of the present disclosure includes a fan section including a fan shaft rotatable about an engine longitudinal axis, a compressor section, and a turbine section including a fan drive turbine mechanically coupled to the fan shaft. The fan section includes a rotor assembly. The rotor assembly includes a hub mechanically attached to the fan shaft. The hub includes an array of slots about an outer periphery of the hub. An array of fan blades each include an airfoil section extending from a root section. A root mount includes arcuate shaped first and second mount members on opposed sides of the root section. The root mount together with the root section is slidably received in a respective one of the slots to establish a hinge joint that mounts the respective fan blade to the hub.

In a further embodiment of any of the foregoing embodiments, each of the fan blades includes a neck portion joining the airfoil section and the root section. The neck portion is pivotable about a mount axis established by the root mount. The neck portion is situated between opposed circumferential walls of the respective slot that are dimensioned to limit rotation of the neck portion about the mount axis, and a projection of the mount axis extends between opposed ends of the respective slot in the installed position.

In a further embodiment of any of the foregoing embodiments, a damping member is between the neck portion and a respective one of the circumferential walls, and the damping member is deformable in response to rotation of the airfoil section about the mount axis.

In a further embodiment of any of the foregoing embodiments, each of the fan blades includes a pair of platforms each having a first portion and a second portion. The first portion extends circumferentially from the second portion to a mate face. The second portion is trapped between the root section and a respective one of the first and second mount members.

In a further embodiment of any of the foregoing embodiments, the mate face is dimensioned to establish a platform interface with the mate face of an adjacent one of platforms, and the adjacent platforms cooperate along the platform interface to dampen movement of the respective fan blade in response to relative circumferential movement between the fan blade and an adjacent one of the fan blades.

In a further embodiment of any of the foregoing embodiments, a circumferential face of the first mount member and a circumferential face of the second mount member are dimensioned to substantially follow an interface profile established by a common radius swept about a mount axis established by the root mount.

In a further embodiment of any of the foregoing embodiments, the root section extends radially inwardly from the airfoil section to a radially inner face, and the radially inner face is dimensioned to substantially follow the interface profile. The respective slot includes an interface region dimensioned to mate with the circumferential faces, and the interface region is dimensioned to extend along a cylindrical projection that spans across a plurality of arcuate flanges of the hub.

In a further embodiment of any of the foregoing embodiments, the root section includes a key portion extending radially inwardly from the first and second mount members to a radially inner face. The radially inner face is situated outside of a boundary of the interface profile, and the key portion is slidably received in a keyway region of the respective slot to limit rotation of the root section about the mount axis in the installed position.

A method of assembly for a gas turbine engine according to an example of the present disclosure includes capturing a root section of an airfoil between first and second mount members of a root mount, the airfoil including an airfoil section extending from the root section, and moving the first and second mount members together with the captured root section as an assembly at least partially into a slot of a rotatable hub to mount the airfoil. Each of the first and second mount members includes an arcuate circumferential face dimensioned to pivotably mount the root section in the slot, and the slot is dimensioned to at least partially follow a contour of the circumferential faces to establish a hinge joint arrangement.

In a further embodiment of any of the foregoing embodiments, the circumferential faces of the first and second mount members are dimensioned to substantially follow an interface profile established by a common radius swept about a mount axis extending through the root section. The slot includes an interface region dimensioned to mate with the circumferential faces.

In a further embodiment of any of the foregoing embodiments, the capturing step includes securing a pair of platforms to the root section. Each of the pair of platforms includes a first portion and a second portion. The first portion extends circumferentially from the second portion, and the second portion is trapped between the root section and a respective one of the first and second mount members. The method includes mechanically attaching the first and second mount members and the captured root section with one or more fasteners to establish the assembly.

The various features and advantages of this invention will become apparent to those skilled in the art from the following detailed description of an embodiment. The drawings that accompany the detailed description can be briefly described as follows.

BRIEF DESCRIPTION OF THE DRAWINGS

FIG. 6 illustrates a sectional view of the root mount of the rotor assembly of FIG. 2.
FIG. 6A illustrates a platform interface according to an example.
FIG. 9 illustrates a rotor assembly according to another example.
FIG. 9A illustrates a damping member according to an example.

Like reference numbers and designations in the various drawings indicate like elements.

DETAILED DESCRIPTION

Figure 1:
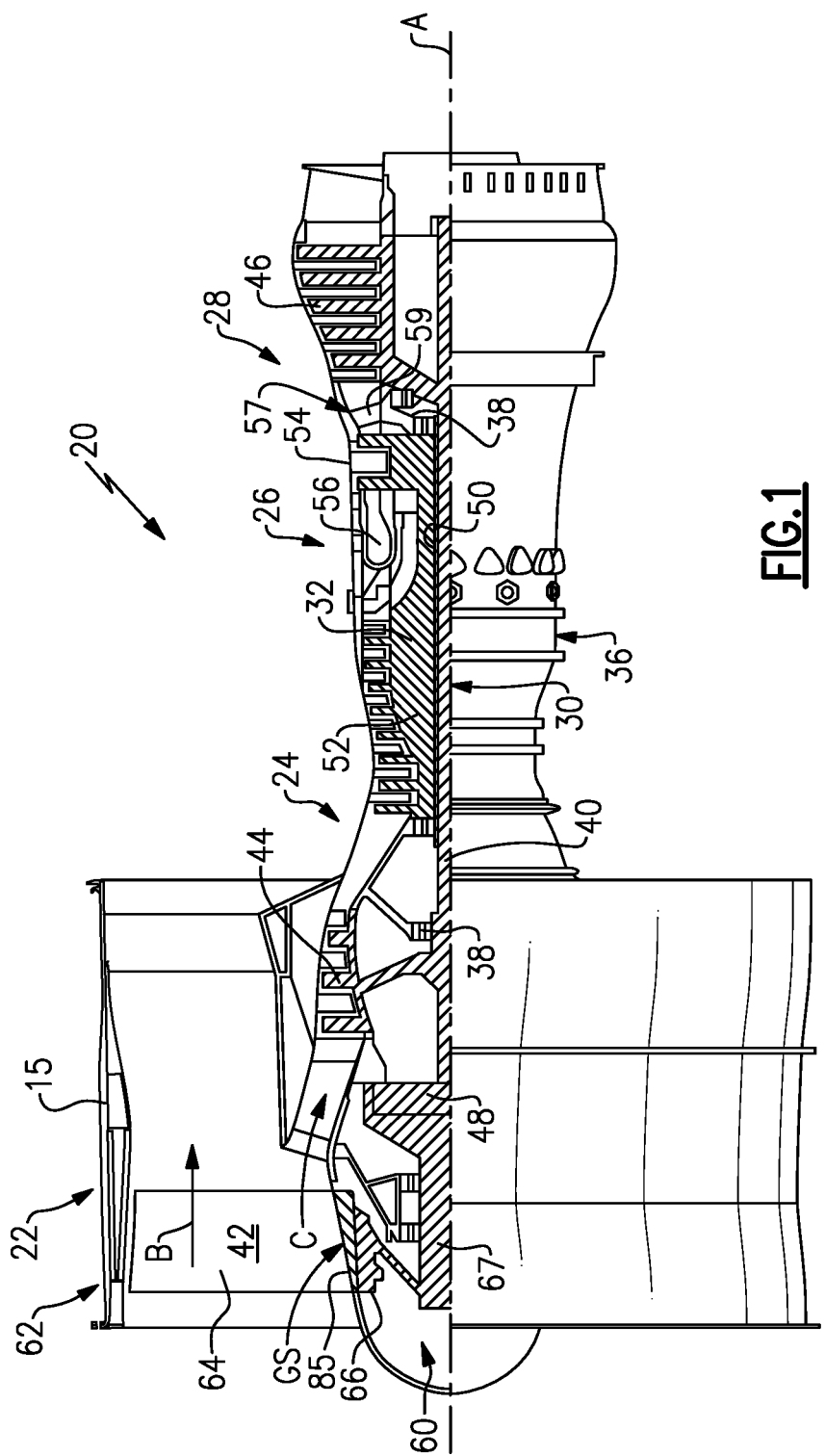
FIG. 1 shows an exemplary gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second (350.5 meters/second).

The fan section 22 includes a rotor (or airfoil) assembly 60 including the fan 42 and a rotatable hub 66. The fan 42 includes an array or row 62 of airfoils or fan blades 64. The fan blades 64 extend circumferentially about and are carried or otherwise supported by the hub 66. The fan blades 64 and hub 66 are rotatable about the engine longitudinal axis A. The hub 66 is mechanically attached to a fan shaft 67, and the fan drive turbine 46 is mechanically coupled to the fan shaft 67 to drive the fan 42.

Figure 2:
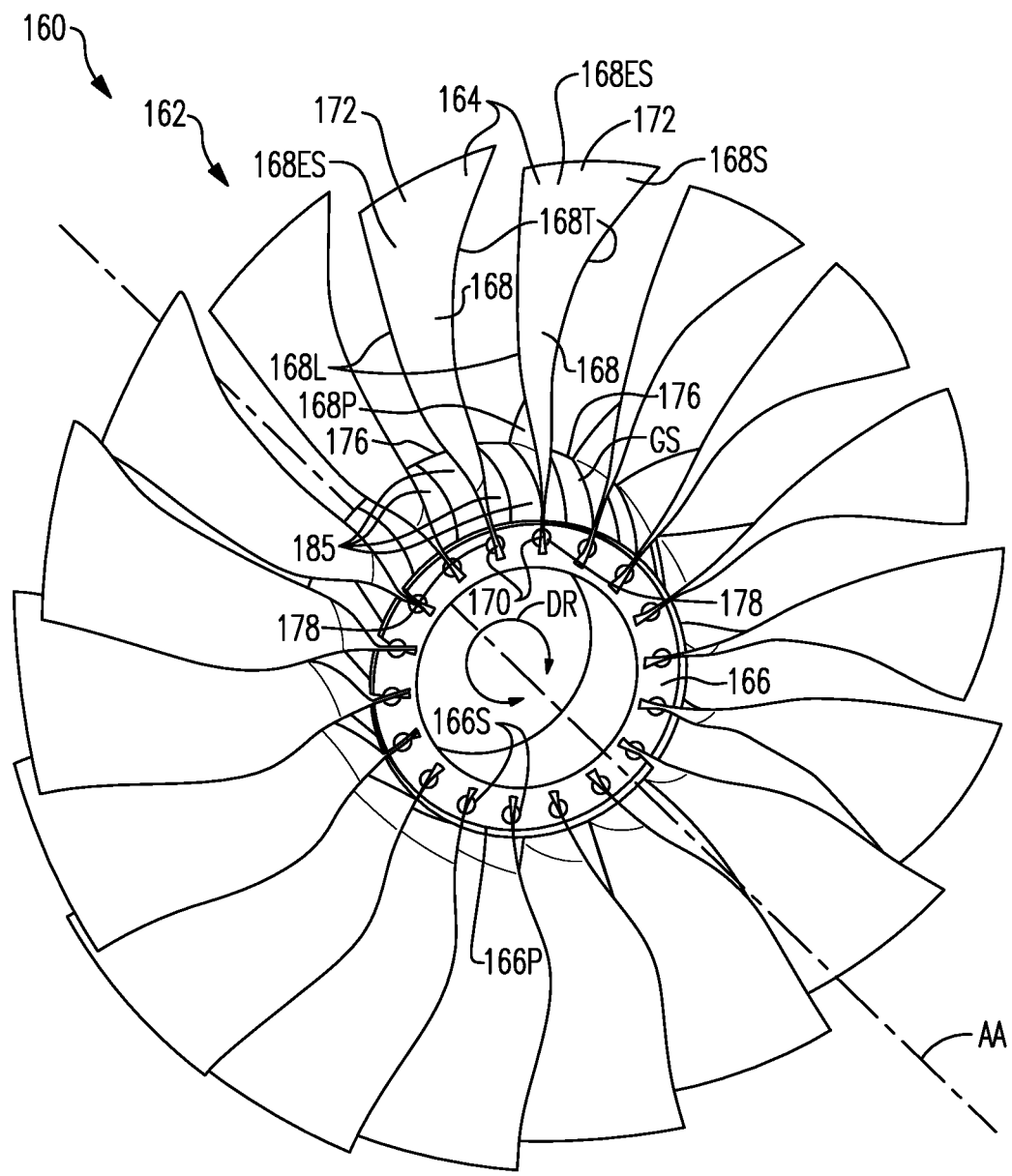
FIG. 2 is a perspective view of a rotor assembly.

FIG. 2 illustrates a rotor (or airfoil) assembly 160 according to another example. In this disclosure, like reference numerals designate like elements where appropriate and reference numerals with the addition of one-hundred or multiples thereof designate modified elements that are understood to incorporate the same features and benefits of the corresponding original elements. The rotor assembly 160 can be incorporated into a gas turbine engine, such as the rotor assembly 60 or another portion of the engine 20 of FIG. 1. Other portions of the engine 20 and other systems can benefit from the teachings disclosed herein, including rotatable and static airfoils in the compressor and turbine sections 24, 28.

Figure 3:
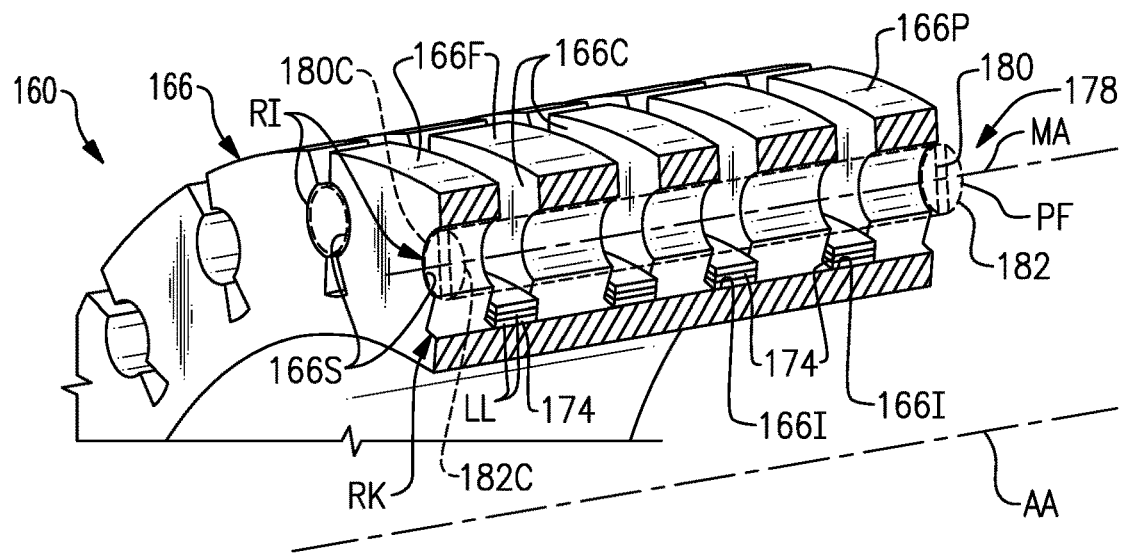
FIG. 3 illustrates a sectional view of a hub of the rotor assembly of FIG. 2.

The rotor assembly 160 includes an array or row 162 of rotatable airfoils 164 that extend circumferentially about and are supported by a rotatable hub 166 (see also FIG. 3). In the illustrative example of FIG. 2, the airfoils 164 are fan blades. Any suitable number of fan blades may be used in a given application, including 24 or fewer fan blades, such as between 12 and 20 fan blades. Although only one (e.g., forwardmost) row 162 of airfoils 164 is shown, the teachings herein can apply to engine arrangements having two or more rows of rotatable airfoils.

Figure 4:
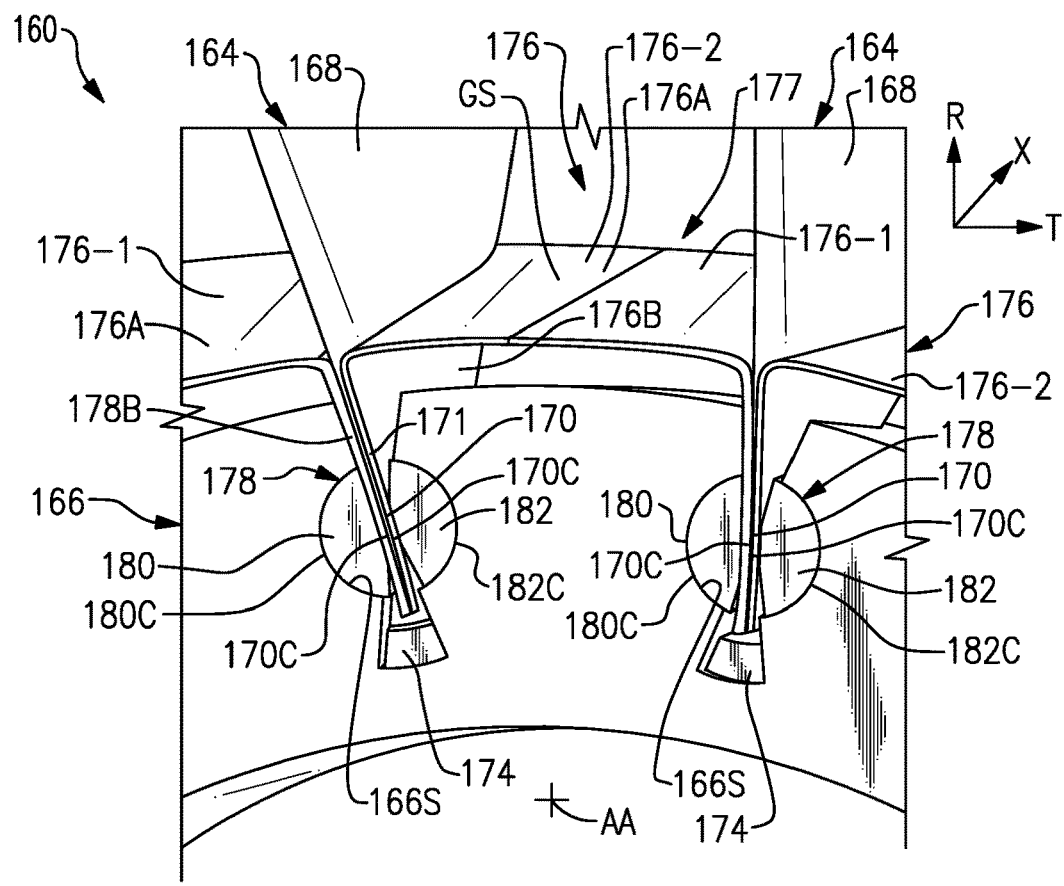
FIG. 4 illustrates an axial view of adjacent airfoils of the rotor assembly of FIG. 2.
Figure 5:
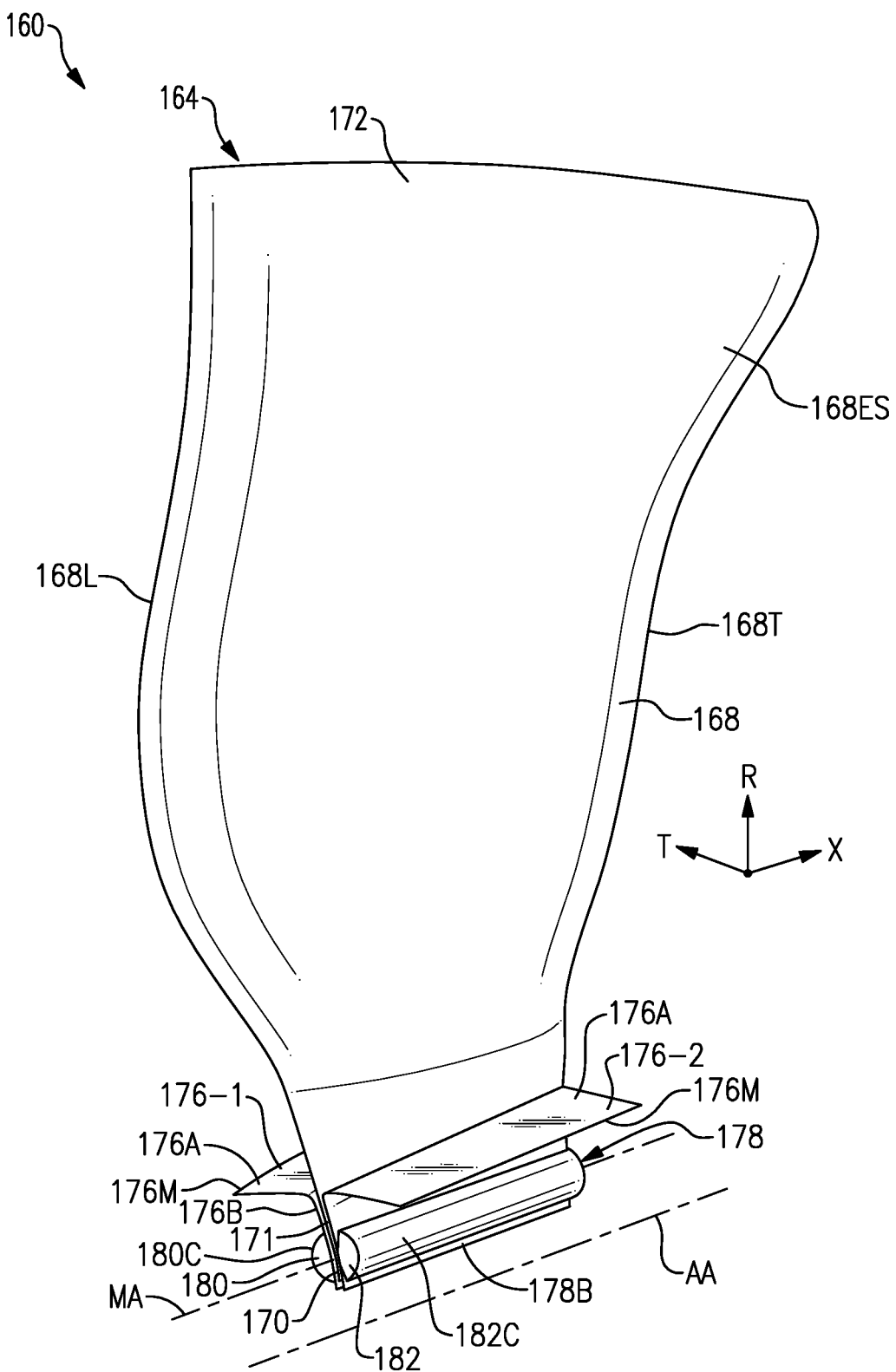
FIG. 5 illustrates a perspective view of an airfoil and root mount of the rotor assembly of FIG. 2.

Each of the airfoils 164 includes an airfoil section 168 that extends in a radial or spanwise direction R from the hub 166 between a root section 170 and a tip portion 172, in a chordwise direction X between a leading edge 168L and a trailing edge 168T, and in a thickness or circumferential direction T between a pressure sidewall (or side) 168P and a suction sidewall (or side) 168S (see FIGS. 4-6 for directions R, X and T). The airfoil section 168 extends from the root section 170 in the radial direction R and terminates at a terminal end along the tip portion 172. The airfoil section 168 and root section 170 are joined at a neck portion 171 (FIGS. 4-6). The pressure sidewall 168P and the suction sidewall 168S are spaced apart or separated in the circumferential direction T and generally meet together at both the leading and trailing edges 168L, 168T.

Each airfoil 164 has an exterior surface 168ES providing a contour that extends in the chordwise direction X from the leading edge 168L to the trailing edge 168T along the airfoil section 168. The exterior surface 168ES generates lift based upon its geometry and directs flow along a gas path, such as the core flow path C and/or bypass flow path B of FIG. 1. It should be understood that the airfoil profile including the contouring of the pressure and suction sides 168P, 168S is exemplary and other airfoil profiles can be utilized according to the teachings disclosed herein.

The airfoil section 168 extends radially outward from at least one platform 176, which provides an inner flow path or gas path surface GS. The platform 176 may be integral with the airfoil 164. In the illustrative example of FIGS. 4-6, the rotor assembly 160 includes a pair of platforms 176 secured to each respective airfoil 164 (indicated at 176-1, 176-2 in FIGS. 4-6). A geometry of the platforms 176-1, 176-2 can be the same or can differ to complement a geometry of the airfoil 164. Each platform 176 is a separate and distinct component from the airfoil 164. The platform 176 can include a surface fairing 185 that defines the gas path surface GS. Each surface fairing 185 can have a generally wedge shaped geometry and can be dimensioned to slope in the chordwise direction X such that the gas path surface GS is generally inclined from an axially forward position to an axially aft position relative to the assembly axis AA, as illustrated by the surfaces fairings 185 of FIG. 2. The surface fairing 185 can be formed from sheet metal and contoured to the predefined geometry of the gas path surface GS, for example. Respective pairs of the surface fairings 185 can be positioned between adjacent airfoils 164 to establish a generally conical aero flowpath, as illustrated by the fairings 85, 185 of FIGS. 1 and 2.

The hub 166 is rotatable in a direction DR about an assembly (or longitudinal) axis AA. The assembly axis AA can be collinear or substantially parallel to the engine longitudinal axis A of FIG. 1. The direction DR can be clockwise or counter-clockwise with respect to the assembly axis AA.

Referring to FIG. 3, with continuing reference to FIG. 2, the hub 166 includes an array of slots 166S defined about an outer periphery 166P of the hub 166. The hub 166 can include an array of annular flanges 166F that extend about the assembly axis AA. The hub 166 includes an array of annular channels 166C established between adjacent pairs of the flanges 166F. In other examples, the channels 166C are omitted. The channels 166C can be dimensioned extend inwardly from and intersect the slots 166S.

Each channel 166C can be dimensioned to receive a reinforcement member 174. Each reinforcement member 174 can have an annular geometry and is dimensioned to extend about an inner periphery 166I of the respective channel 166C.

Various materials can be utilized to form the reinforcement members 174. The reinforcement members 174 can include metallic and/or composite materials. For example, each reinforcement member 174 can be made of a composite material including at least one composite layer LL that is formed to extend about the hub 166. In the illustrative example of FIG. 3, the reinforcement member 174 includes a plurality of composite layers LL in a stacked relationship. Various materials and constructions can be utilized to form the composite layers LL, including carbon and ceramic matrix composite (CMC) materials. For example, the reinforcement member 174 can be a carbon tape having unidirectional fibers and that is continuously wound around the hub 166 two or more times to define the composite layers LL, such as a total of three layers LL. It should be understood that the reinforcement member 174 can have fewer or more than three layers LL. The tape can be a dry form and impregnated or injected with an epoxy or resin after formation along the hub 166, and then cured to fabricate the reinforcement member 174, for example, which can reduce creep. The reinforcement members 174 can at least partially reinforce or support the hub 166 to react centrifugal forces and carry relatively high hoop loads during engine operation, and can reduce an overall weight of the hub 166, for example. In other examples, the reinforcement members 174 are omitted.

Referring to FIGS. 4-5, with continuing reference to FIGS. 2-3, a pair of platforms 176 are secured to the airfoil 164 (indicated at 176-1, 176-2). The platforms 176-1, 176-2 are arranged on opposed sides of the respective airfoil 164. In other examples, the platforms 176-1, 176-2 are a single component. Each platform 176 includes a first portion 176A and a second portion 176B. The platform portions 176A, 176B are separate and distinct components mechanically attached or otherwise secured to the root section 170 of the respective airfoil 164.

The first portion 176A of the platform 176 extends circumferentially from the second portion 176B to a respective mate face 176M (FIGS. 5-6). A respective surface fairing 185 can be secured to the second portion 176B to establish the gas path surface GS. The gas path surface GS can establish at least a portion of an inner diameter flow path boundary of the fan section 22 of FIG. 1, for example. In other examples, the surface fairing 185 is incorporated into the second portion 176B.

Each mate face 176M can be dimensioned to establish a platform interface 177 with the mate face 176M of an adjacent one of platforms 176, as illustrated in FIG. 6 (see also FIG. 4). The platforms 176 can be dimensioned to at least partially yield in response to relative circumferential movement between adjacent airfoils 164 and can dimensioned to react aero-bending and bias the airfoils 164 back toward a neutral position. Adjacent platforms 176 can cooperate along the platform interface 171 to dampen movement of the respective airfoil 164 in response to relative circumferential movement between the airfoils 164. In the illustrative example of FIG. 6, the platforms 176 include circumferentially overlapping portions that establish the mate faces 176M. In the illustrative example of FIG. 6A, platforms 176' include a tongue-and-groove arrangement to establish a platform interface 177'. Damping can be established by frictional contact between surfaces of the platforms 176 along the platform interface 177. Seal members 179 can be positioned relative to adjacent platforms 176 to limit the flow of fluid between intersegment gaps established by the respective mate faces 176M (shown in dashed lines in FIG. 6 for illustrative purposes). In other examples, the seal member 179 is omitted.

The second portion 176B of the platform 176 extends radially inwardly from the first portion 176A. The second portion 176B is dimensioned to follow a contour of the root section 170 of the airfoil 164.

Referring to FIG. 6, with continuing reference to FIGS. 4-5, the rotor assembly 160 includes one or more root mounts 178 for securing respective airfoils 164 to the hub 166. Each root mount 178 includes first and second mount (or interface) members 180, 182 arranged along and secured to circumferentially opposed sides 170C of the root section 170. Each mount member 180/182 has an elongated main body 180B/182B extending between an inner circumferential face 180R/182R and an outer circumferential face 180C/182C. The inner circumferential faces 180R, 182R are dimensioned to at least partially follow a contour of the platform portions 176B. The outer circumferential faces 180C, 182C are dimensioned to mate with opposing surfaces of the respective slot 166S. The outer circumferential faces 180C, 182C can have a substantially arcuate shaped geometry and are dimensioned to pivotably mount the root section 170 in the respective slot 166S of the hub 166 in an installed position. For the purposes of this disclosure, the term "substantially" means±5% of the stated relationship or value unless otherwise disclosed.

In the illustrative example of FIG. 6, the circumferential face 180C of the first mount member 180 and the circumferential face 182C of the second mount member 182C are dimensioned to substantially follow an interface profile PF established by a common radius RM swept about a mount axis MA extending through the root section 170 (see also FIGS. 3 and 5). The interface profile PF is shown in dashed lines in FIGS. 3 and 6 for illustrative purposes.

The respective slot 166S includes an interface region RI dimensioned to mate with the circumferential faces 180C, 182C. The interface region RI is dimensioned to extend along a substantially cylindrical projection that spans across at least some or all of the arcuate flanges 166F of the hub 166 (region RI illustrated in dashed lines in FIG. 3, see also FIG. 6). The mount members 180, 182 cooperate to establish a pinned interface along the respective slot 166S.

Opposing walls of the slot 166S are dimensioned to substantially follow a contour of the circumferential faces 180C, 182C of the mount members 180, 182 to establish a hinge joint arrangement in an installed position. Each slot 166S is dimensioned to at least partially follow a contour and encircle the circumferential faces 180C, 182C to establish the hinge joint arrangement and limit relative radial movement between the airfoil 164 and hub 166.

The mount members 280, 282 of the root mount 178 together with the root section 170 and platforms 176 are slidably received in a respective one of the slots 166S in the hub 166 to establish the hinge joint arrangement that mounts the respective airfoil 164 to the hub 166. The airfoil 164 is pivotable about a hinge line established along the mount axis MA. A projection of the mount axis MA extends between opposed ends of the respective slot 166S in the installed position, as illustrated by FIG. 3. The second portion 176B of each platform 176 is trapped or sandwiched between the root section 170 and a respective one of the mount members 180, 182.

The neck portion 171 is situated between opposed circumferential walls 166W of the respective slot 166S. The neck portion 171 is pivotable in a direction RR about the mount axis MA established by the root mount 178. The circumferential walls 166W are dimensioned to limit rotation of the neck portion 171 in the direction RR about the mount axis MA. In examples, the circumferential walls 166W are dimensioned to abut the second portion 176B of a respective one of the platforms 176 to limit rotation of the airfoil 164 about the mount axis MA (illustrated in dashed lines at 176B' for illustrative purposes). In other examples, circumferential walls 166W are dimensioned to directly abut against surfaces of the airfoil 164 to limit rotation of the airfoil 164 about the mount axis MA.

The root section 170 extends radially inwardly from the airfoil section 168 to a radially inner face 170F. The root section 170 can include a key portion 170K dimensioned to extend radially inwardly from the mount members 180, 182 to the radially inner face 170F of the root section 170. The second portion 176B of each platform 176 can be dimensioned to follow the key portion 170K between the respective mount member 180/182 and the radially inner face 170F.

In the illustrative example of FIG. 6, the root section 170 is dimensioned such that the radially inner face 170F is situated outside of a boundary of the interface profile PF. The key portion 170K together with the adjacent portions of the platforms 176 are slidably received in a keyway region RK of the slot 166S (see also FIG. 3) to limit rotation of the root section 170 about the mount axis MA in the installed position. An angle established between opposed walls of the slot 166S along the keyway region RK can be the same or can differ from an angle established between the circumferential walls 166W adjacent the neck portion 171 of the airfoil 164.

Various materials can be utilized or incorporated in the rotor assembly 160. The root section 170 of the airfoil 164 includes a first material. Each platform 176 includes a second material. Each of the mount members 180, 182 of the root mount 178 includes a third material. The first, second and/or third materials can be the same or can differ in construction and/or composition. In examples, at least one of the first, second and/or third materials is a composite material, and another one of the first, second and/or third materials is a metallic material. For example, the first material can include a composite material, and the second and/or third materials can include a metallic material. Example metallic materials include steel or an aluminum or titanium alloy.

Example composite materials include organic matrix composites. The organic matrix composite can include a matrix material and reinforcement fibers distributed through the matrix material. The reinforcement fibers can be discontinuous or continuous, depending upon the selected properties of the organic matrix composite. Example matrix materials include thermoset polymers or thermoplastic polymers. Example reinforcement fibers include carbon graphite, silica glass, and silicon carbide. Pre-pregs can also be utilized. Given this description, one of ordinary skill in the art will recognize that other types of matrix materials and reinforcement fibers can be utilized, including ceramic matrix composite materials.

The airfoil 164 may be constructed from a composite material, a metal material such as an aluminum or titanium alloy, or a combination of one or more of these, for example. Abrasion-resistant coatings or other protective coatings may be applied to the airfoil 164. The airfoil section 168 can be substantially solid or can be hollow. In examples, the airfoil 164 includes a composite (e.g., carbon-based) core and a metallic sheath 181 including a pair of skins 183 that form an external surface of the airfoil section 168, as illustrated in FIG. 6. In the illustrative example of FIG. 6, the skins 183 are dimensioned to extend from the airfoil section 168 at least partially along the root section 170 to establish a load path between the mount members 180, 182, as illustrated in FIG. 6.

The mount members 180, 182 can have a unitary construction, as illustrated in FIG. 6. In the illustrative example of FIG. 7A, mount member 180'/182' includes a main body 180B'/182B' extending between the inner circumferential face 180R'/182R' and the outer circumferential face 180C'/182C'. A first coating 188' can be disposed along the inner circumferential face 180R'/182R'. A second coating 190' can be disposed along the outer circumferential face 180C'/182C'. The first and second coatings 188', 190' can be made of a material that differs from a material of the main body 180B'/182B', such as a different modulus or strain to distribute loads between the root section 170 and hub 166 and/or vary the amount of rotational deflection of the airfoil 164 upon impact by foreign object debris (FOD).

In examples, the hub 166, mount portions 180, 182 and platform portions 176 are formed from a metallic material, including any of the materials disclosed herein such as titanium. The platform portions 176 may be formed from sheet metal, for example.

Figure 7:
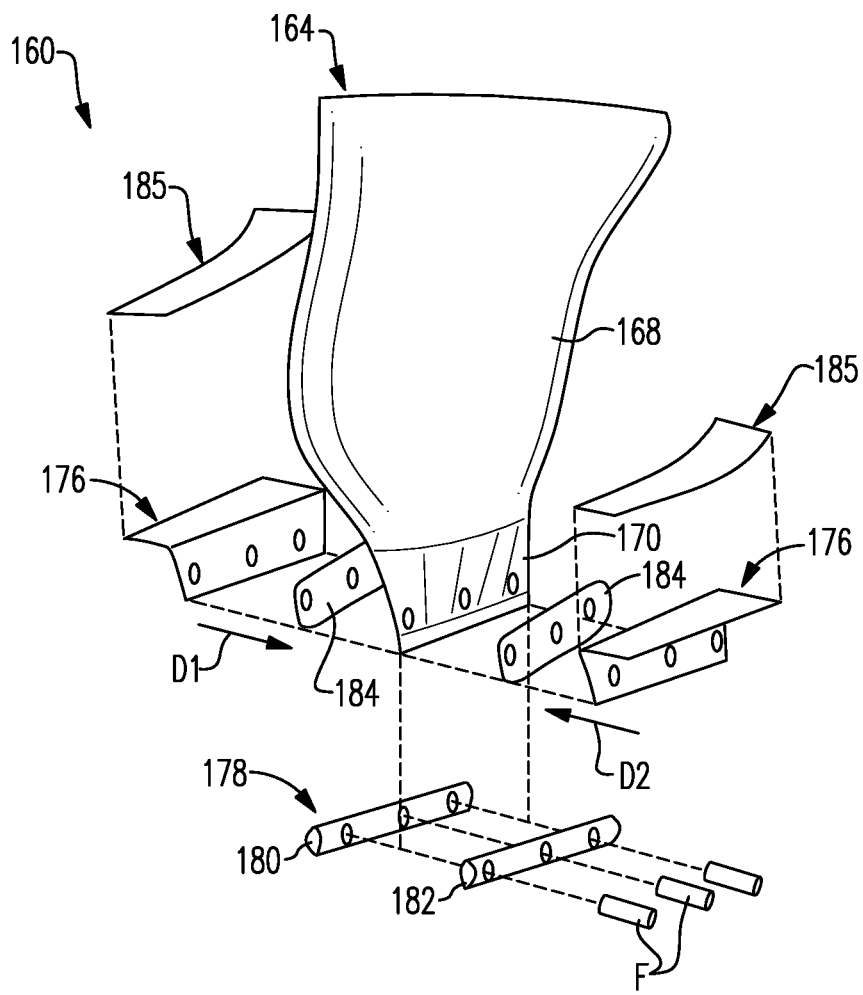
FIG. 7 illustrates an exploded view of portions of the rotor assembly of FIG. 6.
Figure 7A:
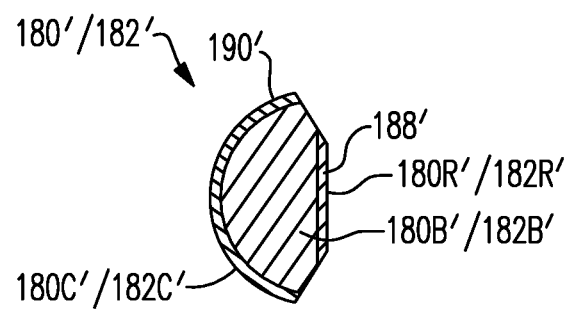
FIG. 7A illustrates a sectional view of a mount member of the root mount.

In the illustrative example of FIG. 6, the airfoil 164 is formed of a composite material including a plurality (or first set) of plies P1 arranged in a layup. The plies P1 are arranged to extend from the root section 170 at least partially into the neck portion 171 and airfoil section 168 of the airfoil 164. At least some of the plies P1 can establish the radially inner face 170F of the root section 170. The composite material can include wedge region P2 arranged in a root section 270 between adjacent plies P1, as illustrated in FIG. 7. The wedge region P2 can include any of the materials and constructions disclosed herein. For example, the wedge region P2 can include a composite material that is co-cured with the plies P1. The plies P1 and wedge region P2 are arranged to establish sloped circumferential sides 270C along the root section 270.

The rotor assembly 160 can be assembled as follows. Referring to FIG. 7, the pair of platforms 176 can be moved in respective directions D1, D2 and into abutment with opposed sides of the root section 170. Direction D1 can be generally opposed to direction D2. The platforms 176 can be bonded or otherwise secured to the root section 170 with one or more layers 184. The layers 184 can be an adhesive or epoxy, for example.

Figure 8:
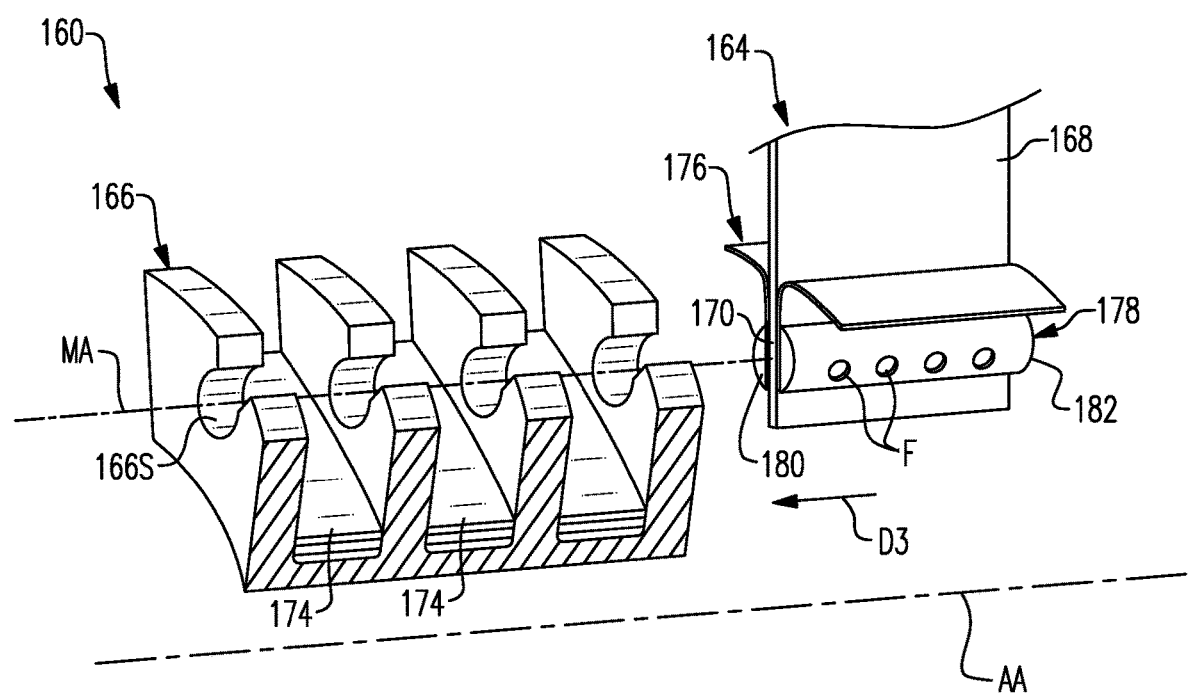
FIG. 8 illustrates a partially assembled view of the rotor assembly of FIG. 6.

The mount members 180, 182 of the root mount 178 can be moved in respective directions D1, D2 and into abutment with the second portion 176B of the respective platforms 176 such that the root section 170 is captured between the mount members 180, 182. The mount members 180, 182 can be mechanically attached to the platforms 176 and root section 170 with one or more fasteners F to establish an assembly, as illustrated by FIGS. 6 and 8. The fasteners F can include bolts, pins, clips and rivets, for example. In the illustrative example of FIG. 6, the fastener F is a bolt that is threadably attached to the mount members 180, 182. In other examples, each mount member 180, 182 is integrally formed with a respective one of the platform portions 176.

Referring to FIG. 8, an outer diameter of each reinforcement member 174 can be positioned radially inward of a radially innermost portion of the mount members 180, 182 with respect to the assembly axis AA, as illustrated by FIGS. 3-4. The mount members 180, 182 of the root mount 178 together with the captured root section 170 of the airfoil 164 and platforms 176 are moved as an assembly or unit in a direction D3, which can be substantially parallel to the assembly axis AA, and at least partially or completely into the respective slot 166S to mount the airfoil 164 to the hub 166. In the installed position, the mount axis MA extends longitudinally along the respective slot 166S to establish the hinge joint arrangement, as illustrated by FIGS. 4 and 6. A respective surface fairing 185 can be secured to the second portion 176B of the platform 176 to establish the gas path surface GS subsequent to positioning the captured root section 170 in the respective slot 166S, as illustrated in FIG. 6. Various techniques can be utilized to secure the surface fairing 185 to the second portion 176B, such as bonding the surfaces with an adhesive or mechanically attaching one or more fasteners.

FIG. 9 illustrates a rotor assembly 260 according to another example. Root section 270 is dimensioned such that a radially inner face 270F of the root section 270 is dimensioned to substantially follow an interface profile PF established by the root mount 278. Opposing walls of a respective slot 266S are dimensioned to substantially follow a contour of the radially inner face 270F and circumferential faces 280C, 282C of mount members 280, 282 to establish a hinge joint arrangement.

At least one damping member 286 can be positioned between a neck portion 271 of the airfoil 264 and a respective one of the circumferential walls 266W of the slot 266S. The damping member 286 is deformable or crushable in response to rotation of the airfoil section 268 about a mount axis MA established by the root mount 278. In examples, the damping member 286 is positioned on only one side of the neck portion 271. In other examples, another damping member 286' is positioned on an opposed side of the neck portion 271 (shown in dashed lines for illustrative purposes). The assembly 260 can include a plurality of damping members 286 uniformly or non-uniformly axially distributed along a portion or entirety of the slot 266S.

Various materials can be utilized to form the damping member 286. The damping member 286 can have a honeycomb construction, as illustrated by FIG. 9A. The honeycomb construction can be additively manufactured, for example. The damping member 286 can be a replaceable, one-event component that is permanently deformable in response to an impact or impulse by FOD such as during a bird strike event, for example. The damping member 286 can serve to absorb the impact or impulse, limit bending and more uniformly distribute torque loads. In other examples, the damping member 286 is made of an elastic material such as rubber that is temporarily deformable. The damping member 286 can be bonded or otherwise secured to the circumferential wall 266W of the slot 266S.

The arrangements disclosed herein including the hinge joint or pivotable interface between the airfoils and hub can be utilized to reduce stress concentrations in the airfoil including the root section that may be otherwise caused by an impact by FOD such as during a bird strike event. The root mounts can be slidably received in the respective slots to mount the airfoils, which may reduce installation and maintenance complexity. The airfoils can incorporate composite materials, which may reduce weight of the assembly. The platforms can be exclusively mounted to the hub via retention in the slots, which may reduce the need for separate mounting features on the hub (e.g., tombstones and fasteners) and which may reduce weight of the assembly.

It should be understood that relative positional terms such as "forward," "aft," "upper," "lower," "above," "below," and the like are with reference to the normal operational attitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An airfoil assembly for a gas turbine engine comprising:
   an airfoil including an airfoil section extending from a root section, the airfoil section extending between a leading edge and a trailing edge in a chordwise direction and extending between a tip portion and the root section in a radial direction, and the airfoil section defining a pressure side and a suction side separated in a circumferential direction; and
   a root mount including first and second mount members secured to circumferentially opposed sides of the root section, wherein arcuate circumferential faces of the first and second mount members are dimensioned to pivotably mount the root section to a hub in an installed position.

2. The airfoil assembly as recited in claim 1, further comprising at least one platform including a first portion and a second portion, the first portion extending circumferentially from the second portion, and the second portion trapped between the root section and a respective one of the first and second mount members.

3. The airfoil assembly as recited in claim 1, wherein the circumferential face of the first mount member and the circumferential face of the second mount member are dimensioned to substantially follow an interface profile established by a common radius swept about a mount axis extending through the root section.

4. The airfoil assembly as recited in claim 3, wherein the root section extends radially inwardly from the airfoil section to a radially inner face, and the radially inner face is dimensioned to substantially follow the interface profile.

5. The airfoil assembly as recited in claim 3, wherein the root section extends radially inwardly from the airfoil section to a radially inner face, and the radially inner face is situated outside of a boundary of the interface profile to limit rotation of the root section about the mount axis in the installed position.

6. The airfoil assembly as recited in claim 1, wherein the root section comprises a first material, and each of the first and second mount members comprises a second material that differs from the first material.

7. The airfoil assembly as recited in claim 6, wherein the first material is a composite material, and the second materials is a metallic material.

8. The airfoil assembly as recited in claim 7, wherein the composite material includes a plurality of plies arranged to extend from the root section at least partially into the airfoil section.

9. The airfoil assembly as recited in claim 1, wherein the airfoil is a fan blade.

10. A gas turbine engine comprising:
a fan section including a fan shaft rotatable about an engine longitudinal axis;
a compressor section; and
a turbine section including a fan drive turbine mechanically coupled to the fan shaft; and
wherein the fan section includes a rotor assembly, the rotor assembly comprising:
a hub mechanically attached to the fan shaft, the hub including an array of slots about an outer periphery of the hub; and
an array of fan blades each comprising:
an airfoil section extending from a root section; and
a root mount including arcuate shaped first and second mount members on opposed sides of the root section, wherein the root mount together with the root section is slidably received in a respective one of the slots to establish a hinge joint that mounts the respective fan blade to the hub.

11. The gas turbine engine as recited in claim 10, wherein each of the fan blades includes a neck portion joining the airfoil section and the root section, the neck portion is pivotable about a mount axis established by the root mount, the neck portion is situated between opposed circumferential walls of the respective slot that are dimensioned to limit rotation of the neck portion about the mount axis, and a projection of the mount axis extends between opposed ends of the respective slot in the installed position.

12. The gas turbine engine as recited in claim 11, further comprising a damping member between the neck portion and a respective one of the circumferential walls, and the damping member is deformable in response to rotation of the airfoil section about the mount axis.

13. The gas turbine engine as recited in claim 10, wherein each of the fan blades comprises:
a pair of platforms each including a first portion and a second portion;
wherein the first portion extends circumferentially from the second portion to a mate face; and
wherein the second portion is trapped between the root section and a respective one of the first and second mount members.

14. The gas turbine engine as recited in claim 13, wherein the mate face is dimensioned to establish a platform interface with the mate face of an adjacent one of platforms, and the adjacent platforms cooperate along the platform interface to dampen movement of the respective fan blade in response to relative circumferential movement between the fan blade and an adjacent one of the fan blades.

15. The gas turbine engine as recited in claim 10, wherein a circumferential face of the first mount member and a circumferential face of the second mount member are dimensioned to substantially follow an interface profile established by a common radius swept about a mount axis established by the root mount.

16. The gas turbine engine as recited in claim 15, wherein the root section extends radially inwardly from the airfoil section to a radially inner face, the radially inner face is dimensioned to substantially follow the interface profile, the respective slot includes an interface region dimensioned to mate with the circumferential faces, and the interface region is dimensioned to extend along a cylindrical projection that spans across a plurality of arcuate flanges of the hub.

17. The gas turbine engine as recited in claim 15, wherein the root section includes a key portion extending radially inwardly from the first and second mount members to a radially inner face, the radially inner face is situated outside of a boundary of the interface profile, and the key portion is slidably received in a keyway region of the respective slot to limit rotation of the root section about the mount axis in the installed position.

18. A method of assembly for a gas turbine engine comprising:
capturing a root section of an airfoil between first and second mount members of a root mount, the airfoil including an airfoil section extending from the root section; and
moving the first and second mount members together with the captured root section as an assembly at least partially into a slot of a rotatable hub to mount the airfoil, wherein each of the first and second mount members includes an arcuate circumferential face dimensioned to pivotably mount the root section in the slot, and the slot is dimensioned to at least partially follow a contour of the circumferential faces to establish a hinge joint arrangement.

19. The method as recited in claim 18, wherein the circumferential faces of the first and second mount members are dimensioned to substantially follow an interface profile established by a common radius swept about a mount axis extending through the root section, the slot includes an interface region dimensioned to mate with the circumferential faces.

20. The method as recited in claim 18, wherein the capturing step includes securing a pair of platforms to the root section, each of the pair of platforms includes a first portion and a second portion, the first portion extends circumferentially from the second portion, and the second portion is trapped between the root section and a respective one of the first and second mount members, and further comprising:
mechanically attaching the first and second mount members and the captured root section with one or more fasteners to establish the assembly.

\* \* \* \* \*